Dec. 6, 1938.　　　A. T. BABINEAU　　　2,139,345
ENERGIZING FLOATING WEDGE FOR VEHICLE BRAKES
Filed Feb. 10, 1938　　2 Sheets-Sheet 1

Inventor
Albert T. Babineau
By Clarence A. O'Brien
Hyman Berman
Attorneys

Dec. 6, 1938.   A. T. BABINEAU   2,139,345
ENERGIZING FLOATING WEDGE FOR VEHICLE BRAKES
Filed Feb. 10, 1938    2 Sheets-Sheet 2
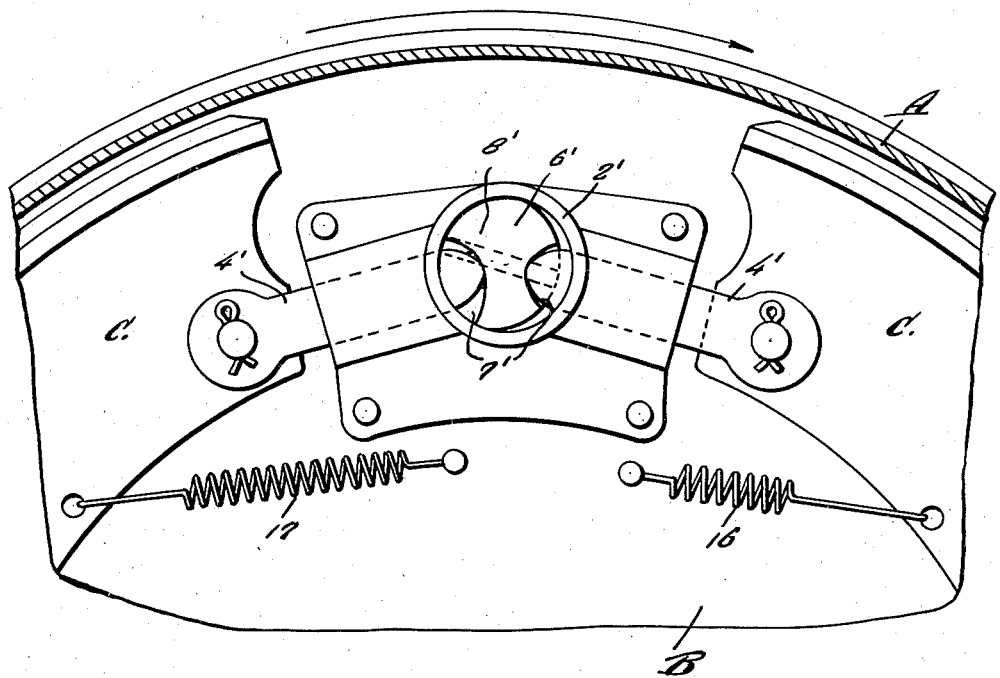
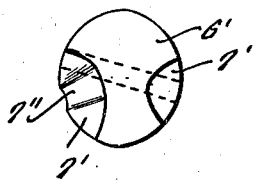
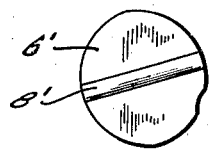
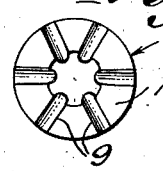
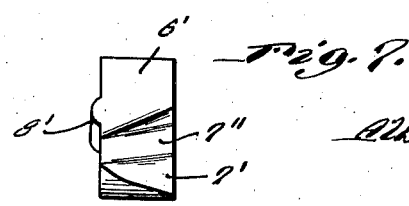
Inventor
Albert T. Babineau
By Clarence A. O'Brien
Hyman Berman
Attorneys Patented Dec. 6, 1938

2,139,345

UNITED STATES PATENT OFFICE 2,139,345

ENERGIZING FLOATING WEDGE FOR VEHICLE BRAKES

Albert T. Babineau, Los Angeles, Calif.

Application February 10, 1938, Serial No. 189,879

8 Claims. (Cl. 188—79.5)

This invention relates to an energizing floating wedge for vehicle brakes, the general object of the invention being to provide an adjusting wedge for the shoes of a wheel brake, which will permit the shoes to expand in a true circular action so as to utilize the entire braking surface of the shoe in the braking action, thus preventing the brakes from too suddenly stopping the wheel or locking the wheel.

Another object of the invention is to provide a spring arrangement for the two shoes which, with the wedge, insures a smooth operation of the braking mechanism.

Another object of the invention is to so construct and arrange the parts as to overcome brake chatter and other noises and to eliminate side pull.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 4 is a view similar to Figure 1, but showing a modification.

Figure 5 is a front view of the wedge head shown in Figure 4.

Figure 6 is a rear view of said head.

Figure 7 is an elevation of the wedge head.

Figure 8 is a view of the grooved face of the head of the shank.

Figure 1:
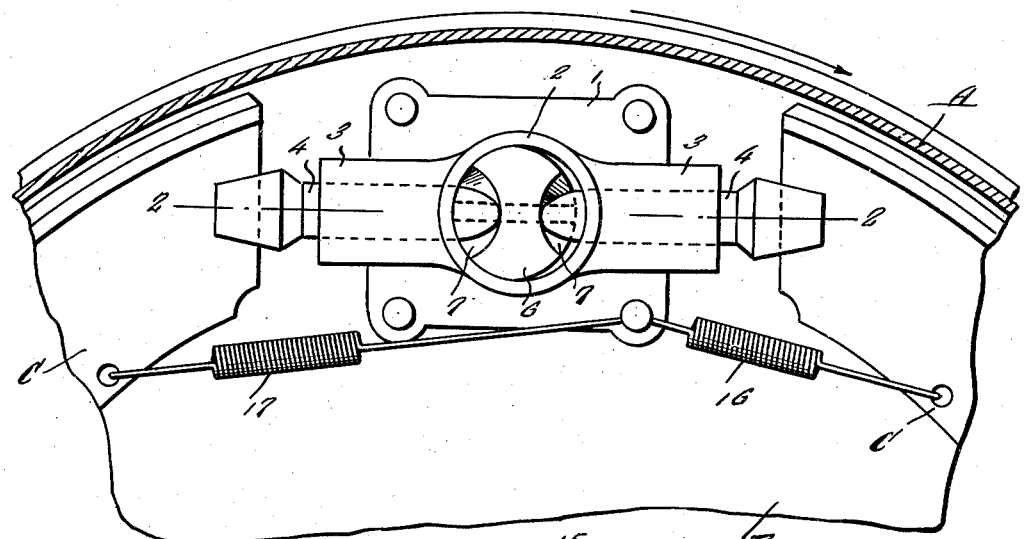
Figure 1 is a fragmentary sectional view through the upper portion of the brake drum with portions of the interior parts in elevation.

In these drawings, a portion of the flange of the drum is shown at A and a portion of the brake anchor plate is shown at B, the brake shoes being shown at C. The numeral 1 indicates a housing passing through a hole in the anchor plate and suitably secured to said plate, that portion of the housing within the drum being formed with the cylindrical chamber 2 and the pair of oppositely arranged sleeves 3 which slidingly receive the studs 4 which have their outer ends notched to receive the adjacent ends of the shoes C. The inner ends of the studs extend into the cylindrical chamber 2 and are beveled as shown at 5 and said ends are also shaped to provide rounded points as more clearly shown in Figure 1.

The wedge head is shown at 6 and is located in the cylindrical chamber 2 and said head has the oppositely arranged recesses 7 therein in which the inner ends of the studs 4 fit. Each recess is of arcuate shape in cross section and has its wall sloping outwardly from the outer face of the head toward the inner face thereof, the inner end of the recess passing through a side of the head and as shown one recess is longer than the other, the short recess being located in the front portion of the head or in that portion which faces the front of the vehicle.

Figure 2:
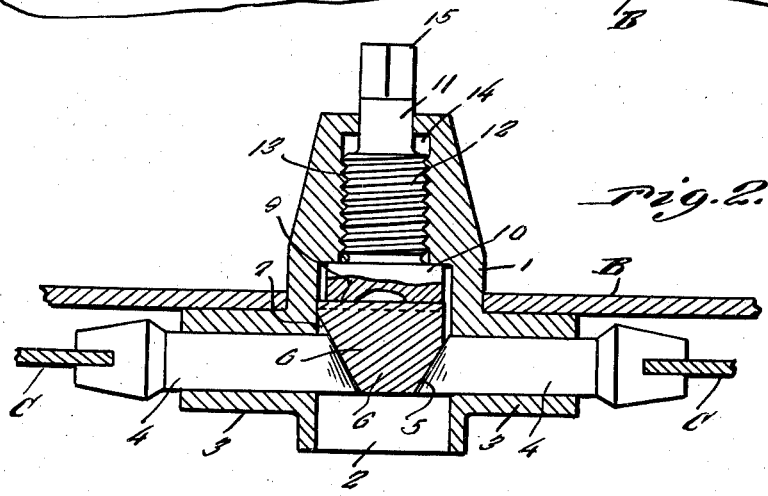
Figure 2 is a section on approximately the line 2—2 of Figure 1.
Figure 3:
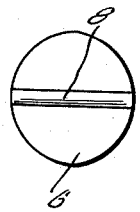
Figure 3 is a view of that end of the wedge which is provided with the rib.

The head is of generally elliptical shape in cross section and has opposite arcuate sides of like radius one eccentric to the other, the rear side being concentric to the axis of the chamber 2 and the front side eccentric to said axis so that the rear side normally contacts the rear part of the chamber 2 and the front side spaced from the front part of the chamber as shown in Figures 1 and 2. For instance if the head was formed from a true cylinder having a radius of $\frac{9}{16}$ the rear arc or side would have a radius of $\frac{9}{16}$ from the true center of the cylinder but the front would be cut away to provide an arc of $\frac{9}{16}$ but with its axis one-eighth off center of the true cylinder.

The inner end of the head is formed with a diametrically extending rib 8 of rounded shape in cross section for engaging any one of a pair of radially arranged grooves 9 formed in the head 10 of a shank 11, which has a threaded part 12 engaging the threaded part 13 of a counter-bore 14 formed in the inner part of the housing 1, the shank passing through a hole in the inner end of the housing and having a non-circular inner end 15 projecting from the housing for receiving a wrench or the like for adjustment of the shank in the housing. The head 10 of the shank fits in the inner end of the chamber 2. As will be understood, by turning the shank in one direction the head 6 will be forced outwardly so that the sloping walls of its recesses 7 will force the studs 4 outwardly and thus expand the brake shoes to adjust the same relatively to the drum.

A short spring 16 connects the forward shoe with a part of the housing and a longer, but weaker spring 17 connects the rear shoe with the same or another part of the housing, the spring 17 being formed of lighter wire than the front spring 16. These springs are used instead of the regular spring at the top of the drum, the lower springs being of the usual or any suitable type.

When the brakes are applied, the wedge head 6 moves forwardly in the chamber 2, thus permitting the shoes to engage the drum without a sudden gripping action so that the brakes are smoothly applied and when the foot pedal or other brake operating member is released, the springs quickly return the shoes to inoperative position.

When the brakes are applied, the lower brake operating wedge, not shown, applies the primary or rear shoe, which acts to push the stud 4, which is connected with it, against the wedge head 6, which moves forwardly and exerts pressure on the second stud 4, so that this second stud pushes the secondary or forward shoe against the drum and this causes all of the lining of the secondary or forward shoe to contact the drum. Both shoes being in a movable position at both the top and bottom, they have a circular expansion which permits the shoes to take a wrapping action on the drum, so that they are self-energizing by the action of the wheel. When the brake pedal is released, the spring 16, which is the stronger spring, returns the secondary or front shoe to neutral position and the stud 4 which is connected with it pushes the wedge rearwardly against the rear half of the cylinder wall and the lighter spring 17 acts with the spring 16 to return the parts to the neutral position shown in Figure 1. The spring 17 helps to keep the brake shoes away from the drum when the brakes are in neutral position to prevent the shoes from vibrating from road shocks.

That form of the invention shown in Figures 4, 5, 6 and 7, is used where the stud 4' are arranged at an angle to each other instead of being substantially horizontally arranged, as in Figure 1. As shown, the wedge head 6' has the same cross-sectional shape as in the first form of the invention, but the recesses 7' are arranged in the lower portion of the wedge and at an angle to each other to conform to the angle of the studs, the angle being approximately 75 degrees, and the rib 8' on the inner end of the wedge is also arranged on an angle so as to cause the wedge to follow the 75 degree angle on the secondary shoe 5 as the wedge moves forwardly in the cylinder 2'. As will be understood, this rib fits in a pair of radial grooves in the head of a shank 11, as before described. The rear large recess for the stud of the rear or primary shoe is flattened at its bottom, as shown at 7'' and extends at approximately a right angle to the axis of the rib. Thus as the wedge moves forwardly and downwardly by pressure from the rear stud 4' and being guided by the rib 8' engaging a pair of grooves of the shank 11, it will cause the right stud 4' to press the secondary or forward shoe against the drum, and as it so moves it has a tendency to oscillate, but the engagement of this flat part 7'' by the point of the rear stud 4' will prevent such oscillation and this will prevent the wedge from binding at the engagement of the rib with a pair of the grooves of the shank 11.

In other respects, this form of the invention is the same, and operates similarly to the first form, though the forward recess 7' has a comparatively snug fit with the pointed end of the forward stud 4', so that it will tend to follow the movement of this stud under the action of the springs 16 and 17.

It is thought from the foregoing description that the advantages and novel features of the invention will be readily apparent.

It is to be understood that changes may be made in the construction and in the combination and arrangement of the several parts, provided that such changes fall within the scope of the appended claims.

Having described the invention, what is claimed as new is:—

1. In brake adjusting means, a housing having a cylindrical chamber therein and openings in portions of its side walls, a wedge head movably arranged in the chamber, said head being of general elliptical shape in cross section and having opposite arcuate sides of like radius, one eccentric to the other and the rear side being concentric to the chamber and the other side eccentric to the chamber and said sides having sloping recesses therein and brake shoe studs passing through the openings in the chamber wall and having the inner ends engaging the recesses.

2. Means for adjusting the shoes of brake mechanism comprising a housing having a cylindrical chamber therein and oppositely arranged sleeves extending from the sides of the chamber, studs connected with the shoes and slidably arranged in the sleeves and having their inner ends beveled, a wedge head movably arranged in the chamber and having oppositely arranged recesses therein provided with sloping walls engaging the beveled ends of the studs, means for adjusting the head longitudinally in the chamber, said head being of general elliptical shape in cross section and having opposite arcuate sides of like radius and one eccentric to the other, the rear side being concentric to the cylindrical chamber and the other eccentric to the cylindrical chamber, the latter side being the forward side of the head.

3. Means for adjusting the shoes of brake mechanism comprising a housing having a cylindrical chamber therein and oppositely arranged sleeves extending from the sides of the chamber, studs connected with the shoes and slidably arranged in the sleeves and having their inner ends beveled, a wedge head movably arranged in the chamber and having oppositely arranged recesses therein provided with sloping walls engaging the beveled ends of the studs, means for adjusting the head longitudinally in the chamber, said head being of general elliptical shape in cross section and having opposite arcuate sides of like radius and one eccentric to the other, the rear side being concentric to the cylindrical chamber and the other eccentric to the cylindrical chamber, the latter side being the forward side of the head, the said adjusting means including a threaded shank in the housing having a tool engaging end projecting from the housing, the other end having a head thereon provided with radial grooves and the inner end of the wedge head having a diametrically arranged rib for fitting in the grooves.

4. Means for adjusting the shoes of brake mechanism comprising a housing having a cylindrical chamber therein and oppositely arranged sleeves extending from the sides of the chamber, studs connected with the shoes and slidably arranged in the sleeves and having their inner ends beveled, a wedge head movably arranged in the chamber and having oppositely arranged recesses therein provided with sloping walls engaging the beveled ends of the studs, means for adjusting the head longitudinally in the chamber, said head being of general elliptical shape in cross section and having opposite arcuate sides of like radius and one eccentric to the other, the rear side being concentric to the cylindrical chamber and the other eccentric to the cylindrical chamber, the latter side being the forward side of the head, the said adjusting means including a threaded shank in the housing having a tool engaging end projecting from the housing, the other end having a head thereon provided with radial grooves and the inner end of the wedge head having a diametrically arranged rib for fitting in the grooves, a short spring connecting the forward shoe with the housing and a longer spring connecting the rear shoe with the same point of the housing.

5. Means for adjusting the shoes of brake mechanism, comprising a housing having a cylindrical chamber therein and sleeves extending from the sides of the chamber, studs connected with the shoes and slidably arranged in the sleeves and having their inner ends beveled, a wedge head movably arranged in the chamber and having recesses therein provided with sloping walls engaging the beveled ends of the studs, means for adjusting the head longitudinally in the chamber, said head being of general elliptical shape in cross section and having opposite arcuate sides of like radius and one eccentric to the other, the rear side being concentric to the cylindrical chamber and the other eccentric to the cylindrical chamber, the latter side being the forward side of the head, springs connecting the upper ends of the shoes to stationary parts of the brake mechanism, the forward spring which is connected with the forward shoe being of greater strength than the rear spring.

6. Means for adjusting the shoes of brake mechanism, comprising a housing having a cylindrical chamber therein and sleeves extending from the sides of the chamber, studs connected with the shoes and slidably arranged in the sleeves and having their inner ends beveled, a wedge head movably located in the chamber and having recesses in its sides provided with sloping walls engaging the beveled ends of the studs, a shank in the housing, means for adjusting the shank longitudinally in the housing, a head on the shank having radial grooves therein and the inner end of the wedge head having a rib for engaging said grooves, said head being of general elliptical shape in cross section and having opposite arcuate sides of like radius, one eccentric to the other, the rear side being concentric to the cylindrical chamber and the other eccentric to the cylindrical chamber, and spring means for holding the parts in neutral position, with the concentric rear side of the head in engagement with the rear part of the chamber wall.

7. Means for adjusting the shoes of brake mechanism, comprising a housing having a cylindrical chamber therein and sleeves extending from the sides of the chamber, studs connected with the shoes and slidably arranged in the sleeves and having their inner ends beveled, a wedge head movably located in the chamber and having recesses in its sides provided with sloping walls engaging the beveled ends of the studs, a shank in the housing, means for adjusting the shank longitudinally in the housing, a head on the shank having radial grooves therein and the inner end of the wedge head having a rib for engaging said grooves, said head being of general elliptical shape in cross section and having opposite arcuate sides of like radius, one eccentric to the other, the rear side being concentric to the cylindrical chamber and the other eccentric to the cylindrical chamber, springs means for holding the parts in neutral position, with the concentric rear side of the head in engagement with the rear part of the chamber wall, said rib being substantially horizontally arranged and the recesses being arranged substantially opposite each other in a horizontal plane.

8. Means for adjusting the shoes of brake mechanism, comprising a housing having a cylindrical chamber therein and sleeves extending from the sides of the chamber, studs connected with the shoes and slidably arranged in the sleeves and having their inner ends beveled, a wedge head movably located in the chamber and having recesses in its sides provided with sloping walls engaging the beveled ends of the studs, a shank in the housing, means for adjusting the shank longitudinally in the housing, a head on the shank having radial grooves therein and the inner end of the wedge head having a rib for engaging said grooves, said head being of general elliptical shape in cross section and having opposite arcuate sides of like radius, one eccentric to the other, the rear side being concentric to the cylindrical chamber and the other eccentric to the cylindrical chamber, spring means for holding the parts in neutral position, with the concentric rear side of the head in engagement with the rear part of the chamber wall, said recesses being located in the lower part of the head and arranged at an angle to each other, and the rib being arranged at substantially the same angle as the forward recess, said forward recess snugly receiving the beveled end of the forward stud, the rear recess being of larger dimension and having a flat bottom part.

ALBERT T. BABINEAU.